United States Patent
Kawahata et al.

[11] 3,793,173
[45] Feb. 19, 1974

[54] WASTEWATER TREATMENT USING ELECTROLYSIS WITH ACTIVATED CARBON CATHODE

[76] Inventors: Masayuki Kawahata, 14 Laury Ln., Scotia; Kenneth R. Price, 1020 University Pl., Schenectady, both of N.Y. 12302

[22] Filed: Feb. 3, 1969

[21] Appl. No.: 795,917

[52] U.S. Cl.................. 204/149, 204/84, 204/272
[51] Int. Cl............................................. B01k 3/00
[58] Field of Search..................... 204/84, 149, 130

[56] References Cited
UNITED STATES PATENTS

| | | | |
|---|---|---|---|
| 2,000,815 | 5/1935 | Berl | 204/84 |
| 3,340,175 | 9/1967 | Mehl | 204/149 |
| 3,454,477 | 7/1969 | Grangaard | 204/84 |
| 3,458,434 | 7/1969 | Peter | 204/149 |

Primary Examiner—A. B. Curtis
Assistant Examiner—C. F. Lefevour
Attorney, Agent, or Firm—Leo I. MaLossi; Joseph T. Cohen; Jerome C. Squillaro

[57] ABSTRACT

An improvement in the electrolytic treatment of wastewater is described in which the reduction of oxygen on an activated carbon cathode is employed to form hydrogen peroxide, which in turn serves to oxidize organic carbon pollutants in the wastewater.

5 Claims, 2 Drawing Figures

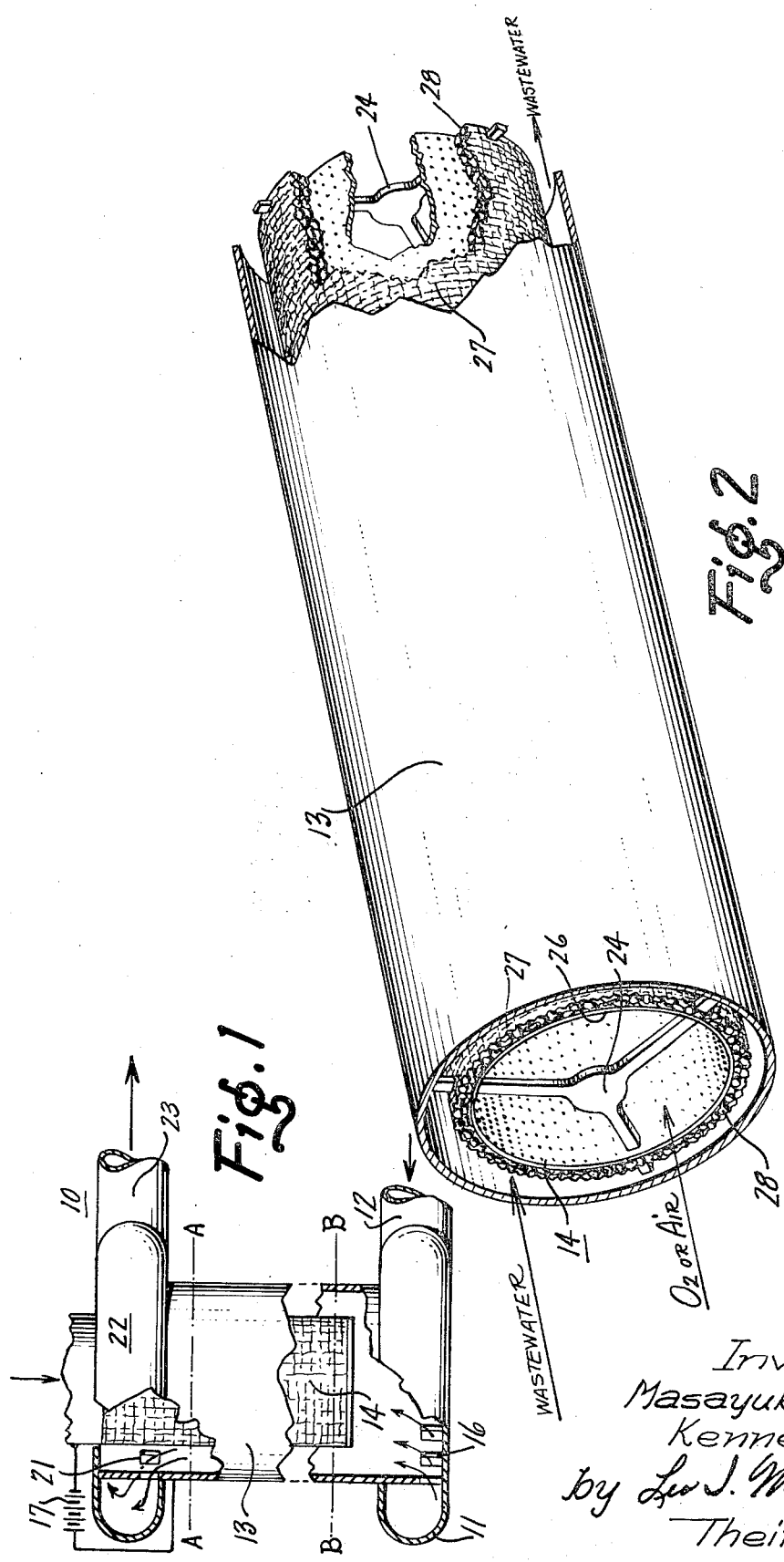

3,793,173

WASTEWATER TREATMENT USING ELECTROLYSIS WITH ACTIVATED CARBON CATHODE

BACKGROUND OF THE INVENTION

The use of an activated carbon cathode for the commercial production of hydrogen peroxide by oxygen reduction in an electrolytic cell has been described in U. S. Pat. No. 2,000,815; Berl and, also, the depolarization of the cathode in an air cell battery by supplying air (or oxygen) under pressure to a cathode having a surface of activated carbon is described in U. S. Pat. No. 2,275,281; Berl; further, the application of electrolysis to wastewater treatment, including electrocoagulation, has been investigated in the past.

However, particularly in those cases in which wastewaters of relatively low conductivity require processing, electrochemical treatment has not been ecomonical. The application of electrochemical treatment to wastewater processing is, therefore, in need of an improvement in which the energy consumption of the process is reduced.

SUMMARY OF THE INVENTION

A treatment system and method for achieving higher efficiencies are made available by the instant invention wherein use is made of the cathodic reduction of oxygen to form hydrogen peroxide which reacts with organic contaminants in wastewater. A hollow porous activated carbon cathode is the means by which oxygen-containing flow is introduced into a system wherein wastewater passes between the cathode surface and an anode surface spaced therefrom. When current is passed through the wastewater, oxygen is reduced at the cathode and is converted to hydrogen peroxide in the presence of the activated carbon. Hydrogen peroxide thereby is made available for more effective oxidation of organic pollutants in the wastewater than would be accomplished by straight electrolysis.

BRIEF DESCRIPTION OF THE DRAWING

The exact nature of this invention as well as objects and advantages thereof will be readily apparent from consideration of the following specification relating to the annexed drawing in which:

FIG. 1 is an elevational view partly cut away to show the means for introducing wastewater to the space between the anode and the cathode constructions and FIG. 2 is an enlarged view in section and partially cut away of a length of treatment unit such as may exist between lines A—A and B—B in the structure of FIG. 1.

DESCRIPTION OF THE PREFERRED EMBODIMENT

In the exemplary treatment device 10 shown in FIG. 1, wastewater to be treated enters manifold 11 via inlet 12 being admitted to the annular space between anode 13 and activated carbon cathode 14 via holes 16 spaced around the circumference of anode 13. Oxygen or an oxygen-containing gas, such as air, under pressure is supplied from a source (not shown) to the interior of hollow cathode 14 (closed off at the lower end thereof to force passage of the oxygen through the cathode structure) for passage radially outward through the porous activated charcoal wall. The rate of admission of the oxygenating gas should be more than sufficient to saturate the wastewater flow with oxygen. During the passage of wastewater through the unit 10, electrical potential is applied across electrodes 13 and 14 from a direct current power source, such as battery 17.

Under the application of the aforementioned electrical potential, current passes through the wastewater disposed between electrodes 13 and 14 and electrolysis of the water occurs to liberate hydrogen at cathode 14, which hydrogen reacts over the contact surface of the activated carbon, with oxygen passing out through the cathode wall 14 to form hydrogen peroxide. The hydrogen peroxide made available in this manner effectively oxidizes the organic pollutants (suspended or dissolved) present both in the wastewater and adsorbed on the outer surface of cathode 14. At the same time, when ferrous metal or aluminum are employed as the anode surface flocculant is generated (by dissociation of the anode and reaction with water) and such flocculant material will help to remove suspended solids, as would be present in raw wastewater flow. Ferrous metal anodes are preferred, however, because the oxidation of the organic carbon by the hydrogen peroxide is enhanced in the presence of ferrous ions. Lead oxide may also be used for the anode.

Important advantages obtained by the use of the oxygenating gas input to the wastewater treatment system are as follows:

a. the combined presence of $Fe^{++}$ and $H_2O_2$ in a system saturated with oxygen leads to reactions in which the $Fe^{++}$ and the oxygen react preferentially to form $Fe(OH)_3 \cdot \times H_2O$ (flocculant) leaving the $H_2O_2$ undepleted and available for reaction with the organic carbon in solution. In the absence of significant amounts of oxygen in the wastewater the effectiveness of oxidation of the organic carbon by $H_2O_2$ generated in the system would be sharply reduced, because of the preferential reaction, which occurs between $Fe^{++}$ and the $H_2O_2$ by which the $H_2O_2$ is greatly diminished, b. the formation of ferric floc masses (floccules) in preference to ferrous floccules has the benefit of increased suspended particle removal, because ferric floccules are larger and have greater surface area with more electric charges available for the attraction of suspended particles, and c. the vigorous bubbling of oxygen through the wastewater flow produces an effluent from the system saturated with oxygen (between about 7 to 11 mg $O_2$/liter depending on the temperature). Having the wastewater so saturated with oxygen is of considerable benefit to recipient streams.

The treated wastewater exits from device 10 via holes 21, manifold 22 and outlet pipe 23. In FIG. 2 a more detailed arrangement of a suitable electrode construction is shown. Anode 13 and cathode structure 14 are held in spaced concentric relation by spacers 24, cathode structure 14 being composed of concentric perforated metal cylinder 26 and screen 27 (which preferably is not electrically conducting) with the activated carbon granules 28 therebetween.

The construction shown is exemplary as the oxygen-containing gas conduit and adjacent anodes could have other shapes. For example, the cathode conduit could be of rectangular cross-section defining open-top troughs to either side thereof together with vertical longitudinally-extending anodes spaced (and electrically insulated) therefrom. Also, if desired, the activated carbon material could be disposed at the cathode as a coating on a porous electrically-conducting substrate. The arrangement shown is suitable for a continuous process, although a batch operation may be employed.

Activated carbon employed should have a surface of at least 50 sq. meters/gram and may, for example, be prepared by treating oil refinery acid sludges with a neutralizing agent and heating the mixture to 800° to 1,200°C as described in U. S. Pat. No. 1,812,316; Berl. The most effective carbon electrodes are those which have a large porous surface area, these being most active in catalyzing both the formation and sequential decomposition of hydrogen peroxide.

Organic carbon occurs in untreated wastewater both in the form of suspended solids and as dissolved solids. Removal of the organic carbon present as suspended solids in such wastewater may be effectively accomplished in several ways as, for example, by the addition thereto of various organic and inorganic flocculant materials or by the use of electrocoagulation (by which flocculant material is generated in situ). The removal of organic carbon in the form of dissolved solids presents a much more difficult problem, however. For example, tests have shown that electrocoagulation by itself is not effective to significantly reduce dissolved solid content. Further, although there is some indication (*Electrochemical Treatment of Municipal Wastewater* by Miller and Knipe, a report from the Department of Health, Education, and Welfare [AWTR-13], 1965) that the addition of flocculant will effectively reduce a small (7–8 ppm) ABS detergent content of wastewater, there does not appear to be any indication that other dissolved carbon constituents would be removed in this way.

A distinct advantage in the practice of this invention is the effectiveness with which the dissolved organic carbon content of wastewater can be substantially reduced. In order to more clearly illustrate this capability in the experimental runs reported below, raw sewage water was first treated with polyelectrolyte flocculants to precipitate suspended solids. The flocculated solids were filtered out and the filtrate was used as a feed wastewater for the experimental runs. The electrolysis cell in each case consisted of electrodes described as follows:

Activated carbon electrode: A porous stainless steel cylinder was disposed concentric with a cylindrical nylon screen leaving an annular gap of one-eighth inch. In this annular gap commercially available activated carbon granules, passing 12 mesh and being retained on 20 mesh, were tightly packed.

Steel Electrode: A carbon steel cylinder was used, the gap between the two electrodes being one-half inch.

EXAMPLE 1

In the first experimental run the activated carbon electrode was used as the cathode and the steel electrode was used as the anode. A constant volume of the filtrate wastewater was placed in a reservoir and was repeatedly circulated through the annular space between the electrodes at a flow rate of 0.7 gallons/min ft$^2$. Commercial oxygen was fed into the device through the porous cathode cylinder at a flow rate of 0.048 ft$^3$/min ft$^2$. The current density employed was 3–6 ma/cm$^2$ and the run was continued until 4,500 Coulombs per liter of water had been applied. Iron oxide in hydrated form, which was produced, was filtered out and the dissolved organic carbon content of the filtrate before and after was determined by means of a Beckman carbon analyzer. It was found that the original dissolved organic carbon in the feed, 89 mg/liter, had been reduced to 32 mg/liter. The odor of the sewage water was also markedly reduced.

EXAMPLE 2

In the second experimental run the polarity was reversed - that is, the carbon electrode was made anode and the steel electrode was made cathode. All the other experimental conditions were the same except for use of a higher current density, 15 ma/cm$^2$. The reduction of dissolved organic carbon was much smaller (from 89 mg/l to 80 mg/l) and the treated water in this run still retained the strong odor of the original wastewater.

Thus, two aspects of this invention have been illustrated by Examples 1 and 2; namely, the pronounced reduction in dissolved organic carbon and the importance in the practice of this invention of making the oxygen (activated carbon) electrode the cathode.

As has been stated hereinabove, the wastewater treated in Examples 1 and 2 had suspended solids removed therefrom solely to more clearly illustrate the effect on dissolved solids, and previously untreated wastewater can equally well be treated with the apparatus and process of this invention, suspended solids being removed by the electrocoagulation effect, which occurs.

From the experimental Example 1, the reduction of dissolved organic carbon content is calculated to be 13 mg of organic carbon/liter by the application of 1,000 Coulombs of electricity/liter. According to the above-mentioned Health, Education and Welfare report straight electrolysis of the effluent from a wastewater secondary treatment process reduced the chemical oxygen demand (COD) by 1.7 mg/1,000 Coulombs of current. In the particular wastewater employed for the experiments described above, the organic carbon concentration in mg/1, was essentially equal to the COD in mg/1. Although an exact comparison of process efficiency is rather difficult, because the experimental conditions employed, including the feed water, differed from those in the Health, Education and Welfare study, a significant increase in process efficiency is evident in the electrochemical wastewater treatment process of this invention as compared to conventional electrolysis.

Calculations indicate that the minimum electrical input should be at least about 33 Coulombs to remove 1 milligram of dissolved organic carbon by oxidation in the practice of this invention. The minimum flow of oxygen containing gas should deliver at least about 7 milligrams of oxygen per liter of wastewater.

What we claim as new and desire to secure by Letters Patent of the United States is:

1. A process for the treatment of wastewater comprising:

a. passing the wastewater through a flow channel comprising spaced anode and cathode electrodes, 1. the cathode electrode being porous and comprising an electrically conductive highly activated carbon layer exposed to the wastewater flow,
b. passing an oxygen-containing gas through said cathode under pressure into the wastewater flow at a significant flow rate and
c. simultaneously applying direct current power to said electrodes sufficient to generate hydrogen peroxide.

2. The process of claim 1 in which the treated wastewater exits from the flow channel saturated with oxygen.

3. The process of claim 1 in which the anode is of a ferrous metal and $Fe(OH)_3 \cdot x H_2O$ floccules are generated in the wastewater in the flow channel.

4. The process of claim 1 in which the rate of passing oxygen-containing gas through the cathode to the wastewater is at least about 7 mg of oxygen/liter of wastewater.

5. The process of claim 1 in which at least 33 Coulombs of electricity is applied per milligram of dissolved organic carbon.

* * * * *